United States Patent [19]

Spinosa et al.

[11] Patent Number: 4,597,498
[45] Date of Patent: Jul. 1, 1986

[54] MOBILE MAINTENANCE STAND AND CRANE APPARATUS

[75] Inventors: Dominic J. Spinosa, Wantagh; Frank Knoll, Huntington Station, both of N.Y.

[73] Assignee: East/West Industries, Inc., Hauppauge, N.Y.

[21] Appl. No.: 681,831

[22] Filed: Dec. 14, 1984

Related U.S. Application Data

[63] Continuation of Ser. No. 435,905, Oct. 22, 1982, abandoned.

[51] Int. Cl.[4] .............................................. B66C 23/06
[52] U.S. Cl. .................................... 212/189; 212/234; 212/237; 212/254; 414/543
[58] Field of Search ............... 212/175, 176, 179, 180, 212/182–184, 189, 223, 232, 234, 244–249, 253, 254, 266–269; 414/540–543, 550, 560; 269/17, 61, 296

[56] References Cited

U.S. PATENT DOCUMENTS

| 798,666 | 9/1905 | Derx | 212/184 |
| 884,307 | 4/1908 | Winemiller et al. | 212/248 |
| 1,614,697 | 1/1927 | Snook | 269/17 |
| 2,023,790 | 12/1935 | Ormsby | 212/184 |
| 2,409,929 | 10/1946 | Cohen | 212/266 |
| 2,759,604 | 8/1956 | Carpenter | 212/253 |
| 2,804,979 | 9/1957 | Lassiter | 212/189 |
| 2,976,033 | 3/1961 | Martin | 269/17 |
| 3,024,925 | 3/1962 | Werner et al. | 414/543 |
| 3,085,798 | 4/1963 | Gavette | 269/17 |
| 4,239,196 | 12/1980 | Hanger | 269/17 |

Primary Examiner—Galen L. Barefoot
Assistant Examiner—Stephen P. Avila
Attorney, Agent, or Firm—Leonard W. Suroff

[57] ABSTRACT

A mobile maintenance stand for servicing and transporting ejection seats utilized in aircraft includes a mobile platform having disposed thereon upright arms adapted to encompass an ejection seat and rotatable to expose the various portions thereof for servicing and maintenance of the wiring, electronics, etc. disposed therein. The platform is rotatable 360 degrees in a horizontal plane with the upright arms rotatable 270 degrees in a vertical plane and is mounted on a lower portion provided with wheels disposed at the distal ends of outwardly extending arms. The arms may be extended to provide additional stability and removable screw jacks are attachable on the arms to provide a rigid stable platform. Additionally included on the rotating base platform is a removable telescoping crane assembly that may be attached to an ejection seat disposed in an aircraft for removing the seat therefrom and placing it in position to be retained by the pair of servicing arms.

19 Claims, 16 Drawing Figures

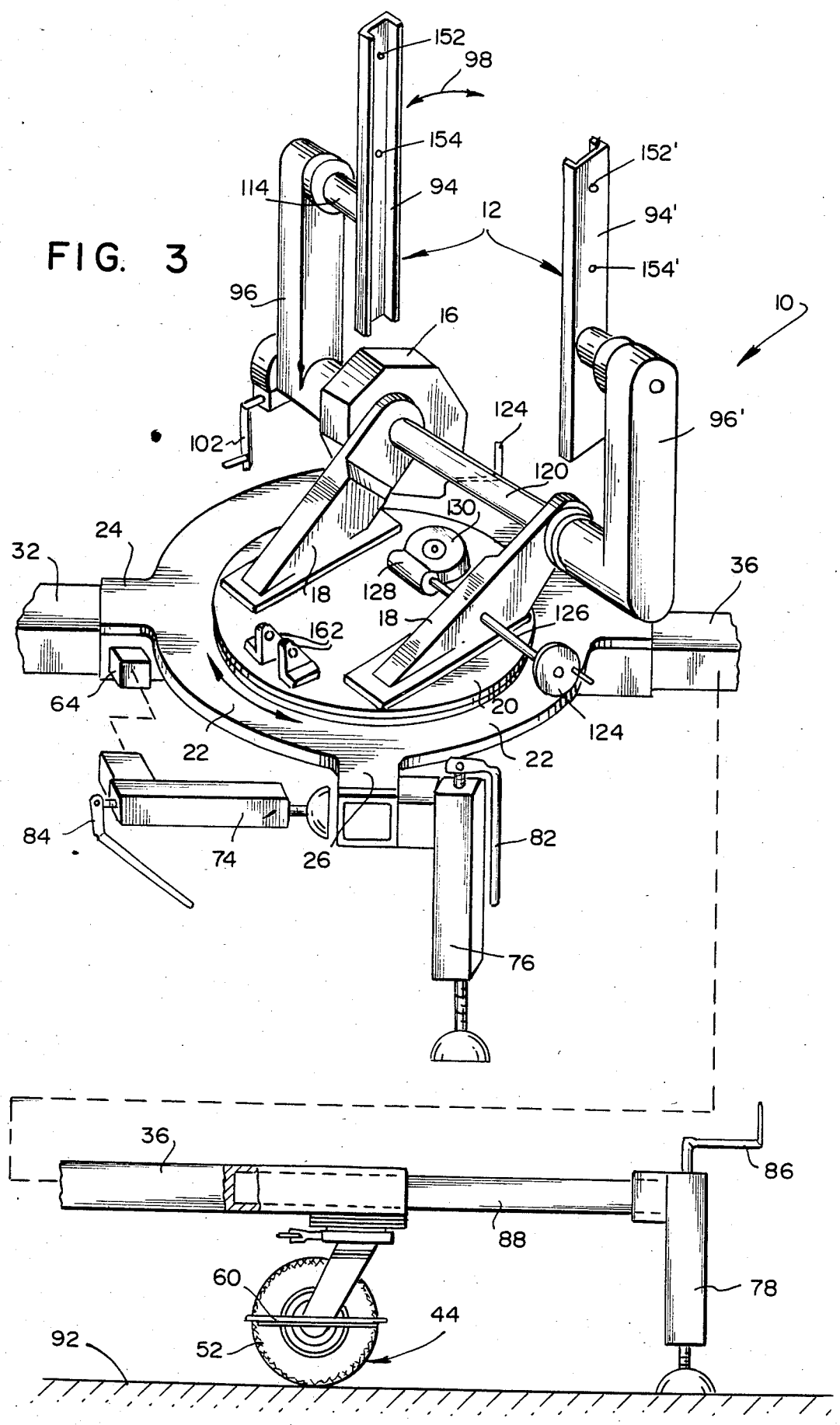

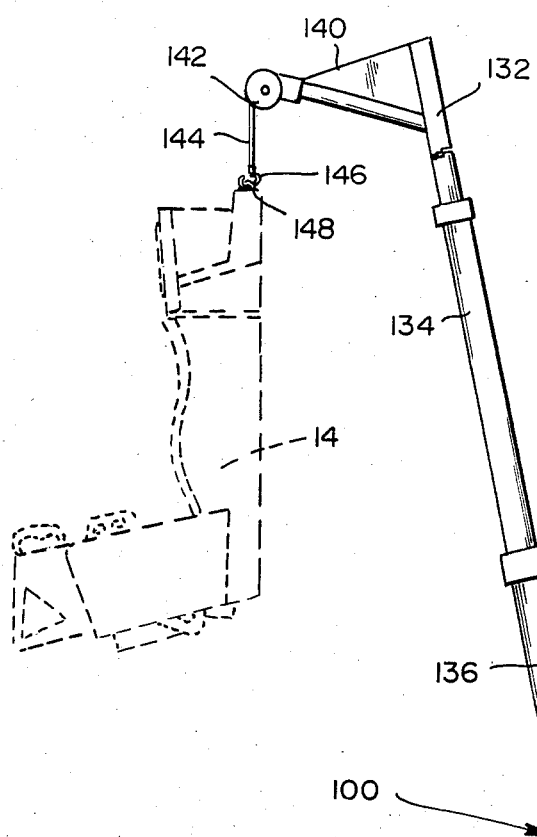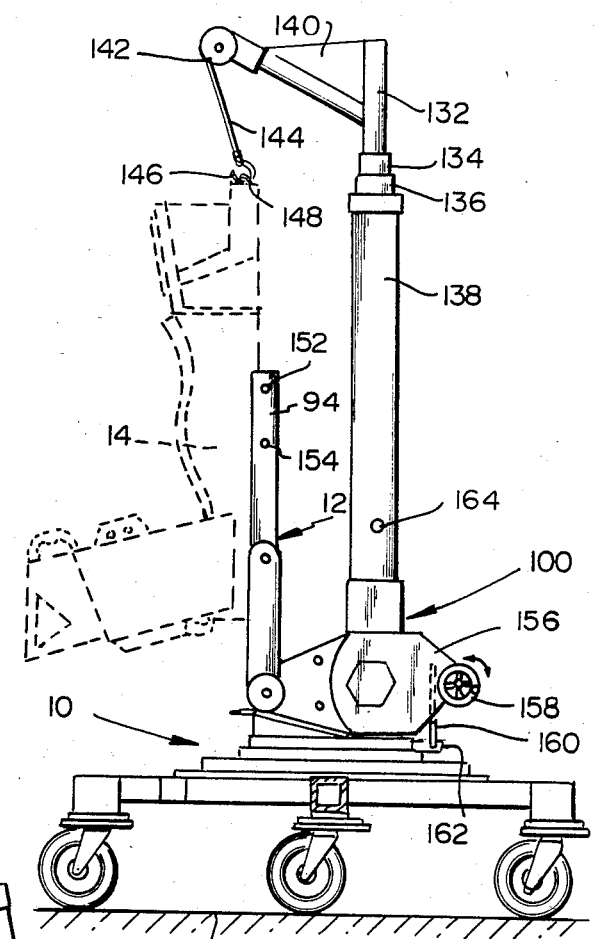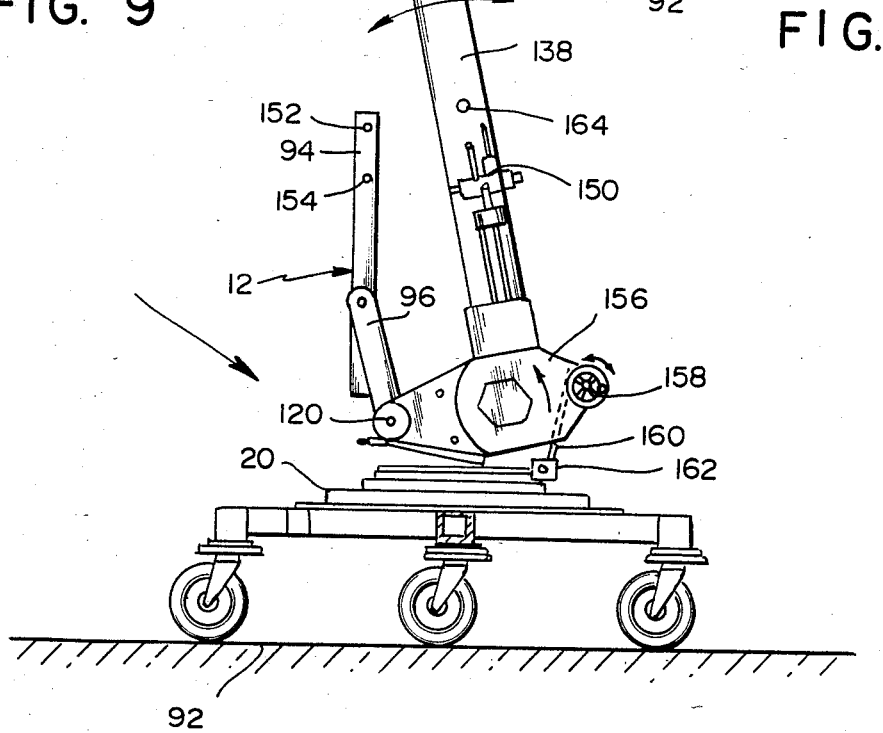
FIG. 9
FIG. 8

MOBILE MAINTENANCE STAND AND CRANE APPARATUS

This application is a continuation, of application Ser. No. 435,905, filed Oct. 22, 1982 now abandoned.

BACKGROUND OF THE INVENTION

1. Field of the Invention

The present invention relates to maintenance fixtures and, in particular, to a mobile maintenance stand and crane apparatus suitable for removing ejection seats, placing them on a mobile maintenance stand for servicing, maintenance and transportation.

2. Discussion of the Relevant Art

The art abounds with numerous devices that may be utilized to remove ejection seats from military or commercial aircraft. Generally these devices are cumbersome, require more than one man to operate, and are difficult to transport the ejection seat from one location to another. Different types of maintenance fixtures are required for ejection seats fabricated by different manufacturers.

The present invention overcomes the shortcomings of presently utilized devices by providing a mobile maintenance stand which is adapted to receive all known ejection seats and provides 360 degrees rotation on the horizontal axis and 270 degrees of rotation on the vertical axis, thereby enabling ground maintenance personnel to perform the required service functions with complete freedom of access. Additionally, the mobile maintenance stand includes a crane which can be utilized for the removal and replacement of aircraft canopies and ejection seats with minimal equipment or manpower. Upon removal of the ejection seat from the aircraft, the crane permits installation of the ejection seat on the mobile maintenance stand for transportation and maintenance.

SUMMARY OF THE INVENTION

Therefore, it is an object of the present invention to provide a lightweight, rugged mobile maintenance stand and crane apparatus which may be used for servicing and transporting ejection seats.

It is another object of the present invention to provide a mobile maintenance stand that can provide 360 degrees rotation on the horizontal axis and 270 degrees of rotation on the vertical axis.

It is another object of the present invention to provide a mobile maintenance stand for servicing and transporting ejection seats that has manual, adjustable controls including a height control.

It is yet a further object of the present invention to provide a mobile maintenance stand for servicing and transporting ejection seats that may be quickly assembled and disassembled and stores in a minimal volume.

It is yet another object of the present invention to provide a mobile maintenance stand and crane apparatus that includes adjustable arms radiating from the base portion in order to increase the stability thereof.

It is yet another object of the present invention to provide a mobile maintenance stand for servicing and transporting ejection seats that provides a screw jack device for adding rigidity to the apparatus when it is fully extended.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best definde by the appended claims.

BRIEF DESCRIPTION OF THE DRAWING

In order that the invention may be more fully understood, it will now be described, by way of example, with reference to the accompanying drawing in which:

FIG. 3 is an enlarged pictorial representation of the driving mechanisms of the various parts of the maintenance stand shown in FIG. 2;

FIG. 8 is a side view in elevation of a mobile maintenance stand with a crane apparatus disposed thereon in its extended position for removing an ejection seat;

FIG. 9 is a side view in elevation of the apparatus shown in FIG. 8 with the crane in its retracted or collapsed position showing the manner in which an ejection seat may be affixed on the maintenance stand;

Figure 1:
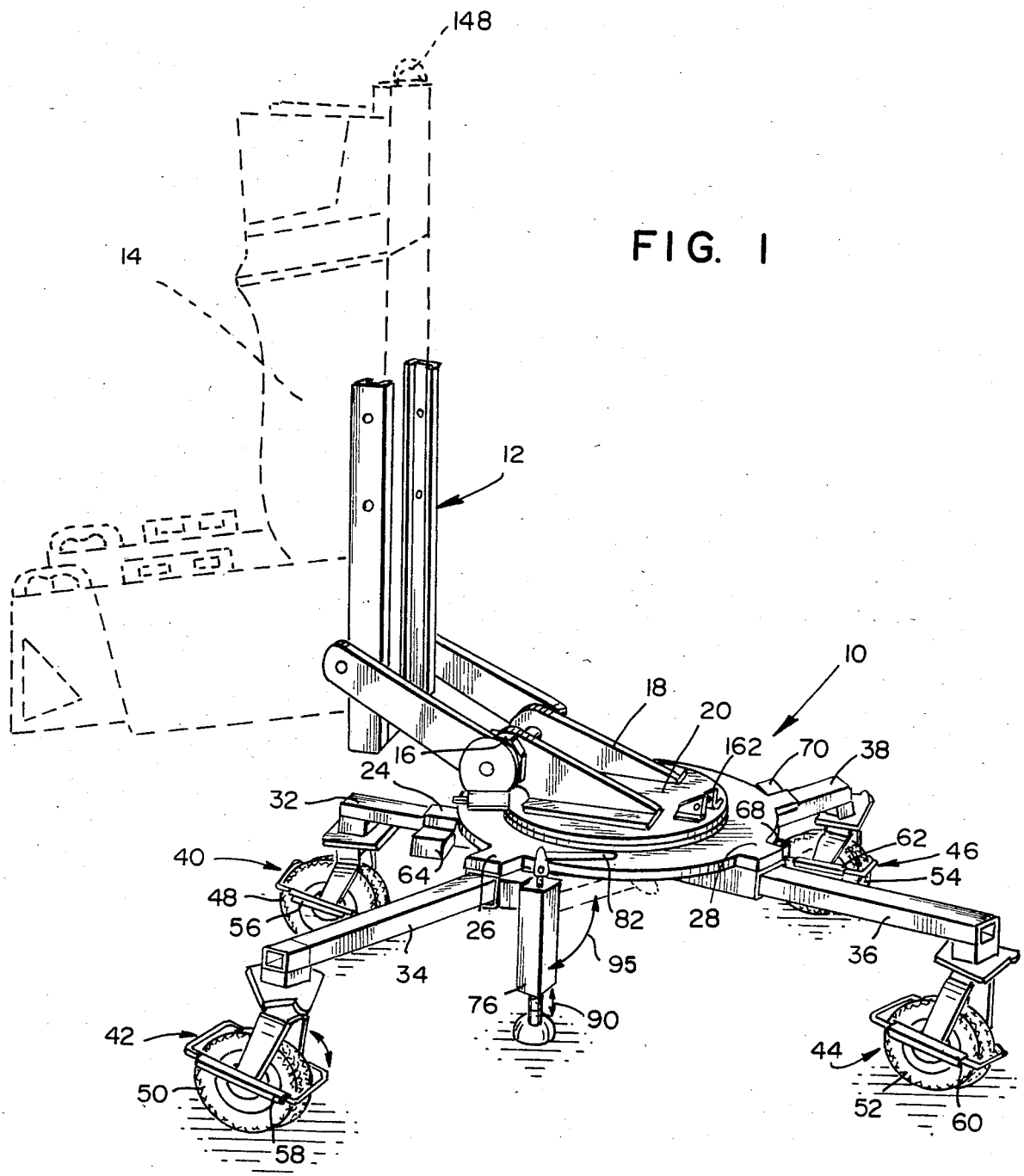
FIG. 1 is an isometric pictorial representation of a mobiCle maintenance stand, according to the principles of the present invention showing an ejection seat mounted thereon in position for servicing and/or transportation.
Figure 2:
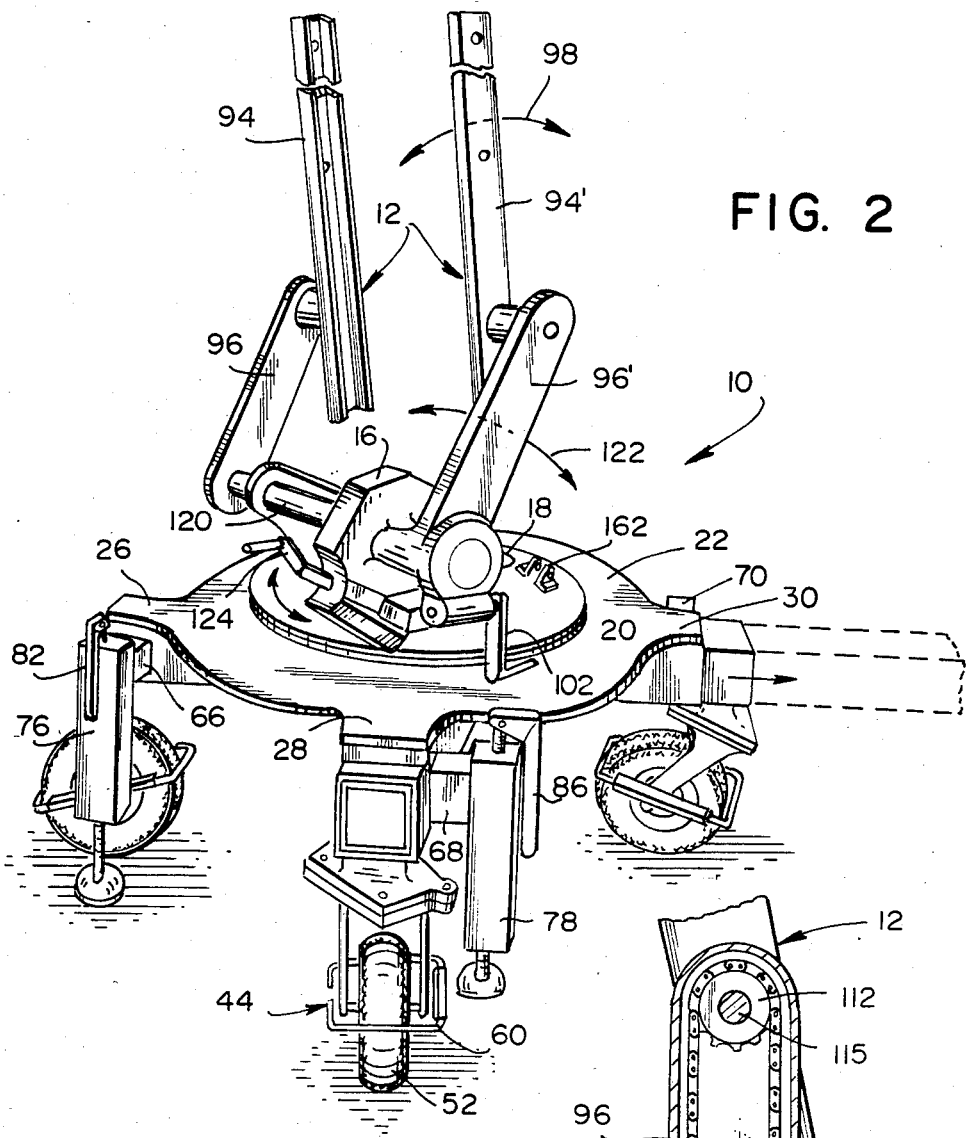
FIG. 2 is an enlarged pictorial representation of the maintenance stand shown in FIG. 1, showing the areas of movement of the various elements provided thereon.

The subject matter which we regard as our invention is particularly pointed out and distinctly claimed in the concluding portion of this specification. The invention, however, both as to organization and method of operation, together with further objects and advantages thereof may best be understood by reference to the following description taken in connection with the accompanying drawing wherein like reference characters refer to like elements.

DESCRIPTION OF THE PREFERRED EMBODIMENT

Referring now to the figures and, in particular, to FIG. 1 there is shown a mobile maintenance stand 10 which has disposed between a pair of articulated arms 12 an ejection seat 14 shown in broken lines. The lower portion of the articulated arms 12 are coupled, via a gearbox mechanism 16 and bracket assembly 18 to a flat plate or upper base portion 20 which is rotatably mounted upon a lower base portion 22 and is provided with a plurality of equal spaced radially extending arms 24, 26, 28, and 30.

Each of the extendable arms 24, 26, 28, and 30 are provided with a at least first extendable section 32, 34, 36, and 38, respectively, which preferably are hollow and rectangularly-shaped when viewed in cross section. The reason for them being hollow will be explained hereinafter. The arm sections 32, 34, 36, and 38 telescope within arms 24, 26, 28, and 30, respectively, and may be extended outwardly therefrom and/or may include additional sections, not shown, in order to provide additional stability (sway bracing) for the mobile maintenance stand 10. At the underside of each of the arm sections a wheel assembly 40, 42, 44, and 46 is provided. Each wheel assembly includes a pneumatic tire 48, 50, 52, and 54 and a braking mechanism 56, 58, 60 and 62 of a conventional design which may be used to inhibit the rotation of the wheels thereby preventing movement of the maintenance stand as desired. Arm sections 32, 34, 36, and 38 when fully extended provide additional sway bracing for the mobile maintenance stand thereby reducing any sway or instability which may be present. Additional sections may be inserted into each of the extending arm sections, as will be explained hereinafter, when the crane assembly 100 is utilized on the mobile maintenance stand as will be described in conjunction with FIGS. 8 and 9.

Extending in a horizontal plane transverse to each of the arms 24, 26, 28 and 30 is an outwardly extending rectangularlyshaped protruding member 64, 66, 68, and 70 (see FIG. 1) which is adapted to receive and cooperate with a screw jack 72, 74, 76, and 78. The screw jacks extend, when aligned in a vertical direction, downwardly beyond the circumference of tires 48, 50, 52 and 54 when adjusted by means of crank handles 80, 82, 84 and 86 thereby providing rigidity for the mobile maintenance stand 10. It is also possible to utilize the screw jacks 72, 74, 76 and 78 at the distal end of a second extending arm section 88 which may be utilized with each of arm sections 32, 34, 36, and 38 to further increase the stability (sway bracing) of the mobile maintenance stand to its fully extended position when utilized together with the crane assembly 100 (See FIG. 3). Rotation of the crank handles 80, 82, 84 and 86 provide adjustment in the direction of arrow 90 thereby raising the mobile platform so that the tires are not in contact with the ground or surface 92. The screw jacks 72, 74, 76 and 78 may also be removed and rotated (90 degrees) in the direction of arrow 95 and be tucked in, out of the way, permitting movement of the mobile maintenance stand along a flat surface for transportation of an ejection seat 14 mounted thereon (See FIG. 6).

Figure 4:
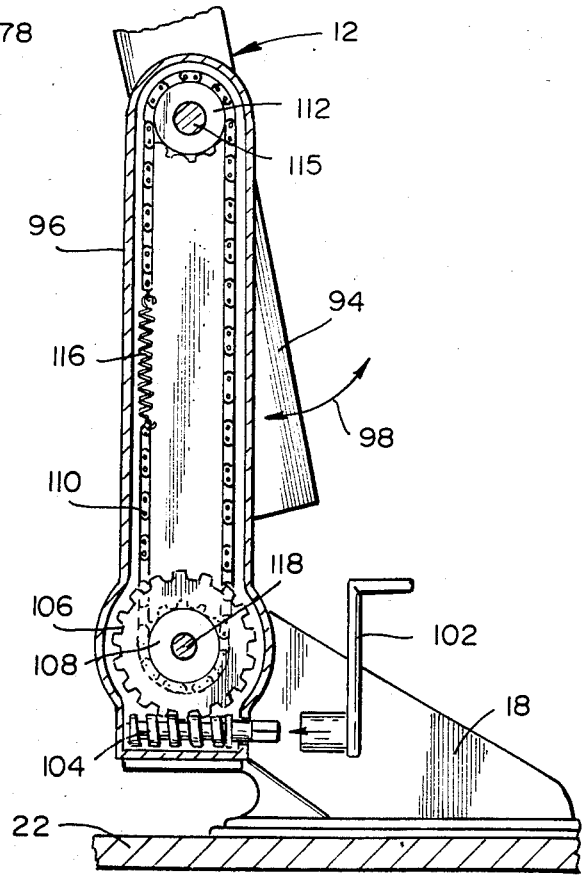
FIG. 4 is an end view, with the cover removed, of the adjustment mechanism utilized in the vertical plane.

Referring now to FIG. 3 which shows an enlarged pictorial representation of the mobile maintenance stand 10 with the first and second arm sections 32, 34, 36, 38 and lost arm sections 88, respectively, fully extended and screw jack 78 inserted on the distal end of second arm section 88 to provide a rigid stable maintenance stand and platform onto which the crane assembly 100 may be installed. The articulated arms 12 includes an upper section 94 and a lower section 96. The arm upper section 94 may be rotated in the direction of arrow 98 by the rotation of handle 102 which is removably affixed to worm gear 104. Worm gear 104 is in intimate cooperating contact with worm wheel 106 as is shown in FIG. 4, and is caused to rotate as crank handle 102 rotates. The hub 108 of worm wheel 106 is provided with teeth upon which a link chain 110 is mounted. The other end of chain 110 circumscribes a chain driven gear 112 which is affixed to the axle 114 provided on the upper section 94 of the articulated arms 12 thereby providing angular rotation as indicated by the arrow 98. The chain 110 is held taut at all times by utilization of a coil spring 116 affixed to the ends of chain 110. Hub 108 of worm gear 106 is affixed on a shaft 118 that extends horizontally through axle 120 and gear box 16 to the other articulated arm 12 comprising upper section 94' and lower section 96' and, thus, both upper sections 94 and 94' of the articulated arms 12 are caused to rotate in unison. A gearbox mechanism 16 controls the movement of the lower sections 96 and 96' of articulated arms 12 in the direction of arrow 122 by the turning of crank handle 124.

Figure 7A:
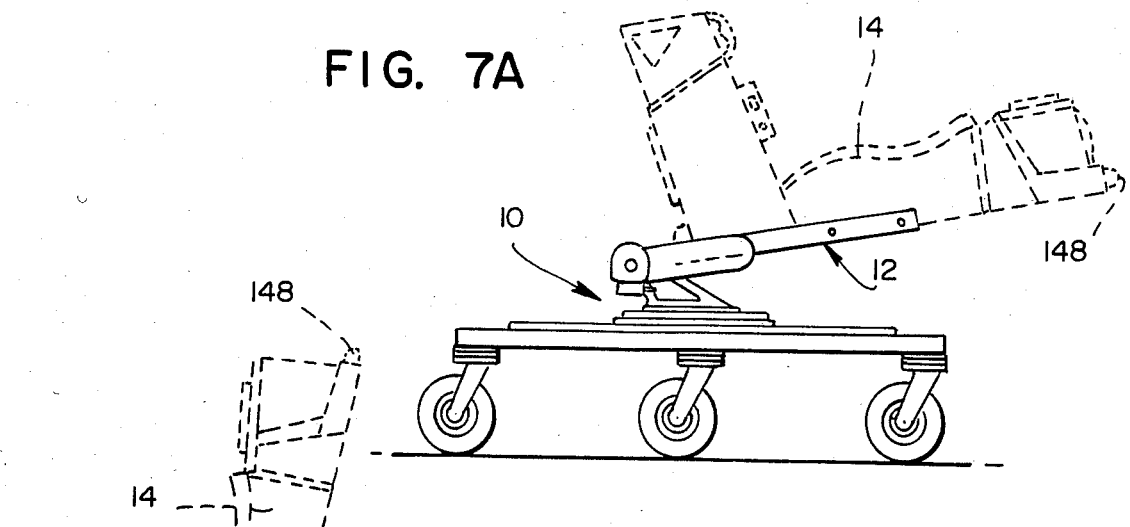
FIGS. 7a, 7b, and 7c illustrate the various positions of the mobile maintenance stand when rotated for servicing of an ejection seat.
Figure 7B:
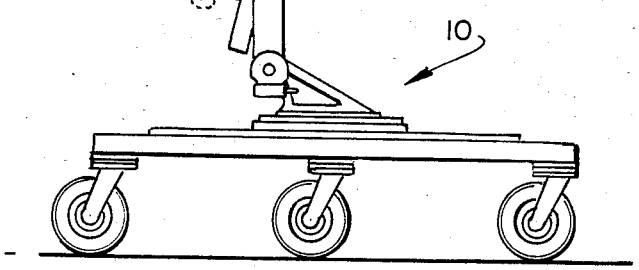
Figure 7C:
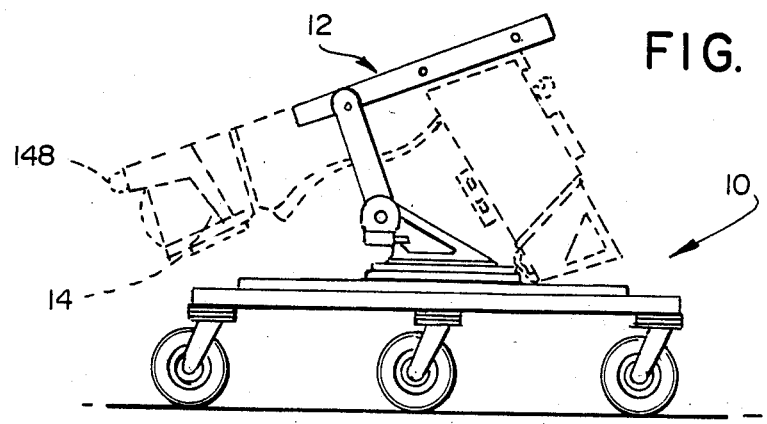
Figure 11:
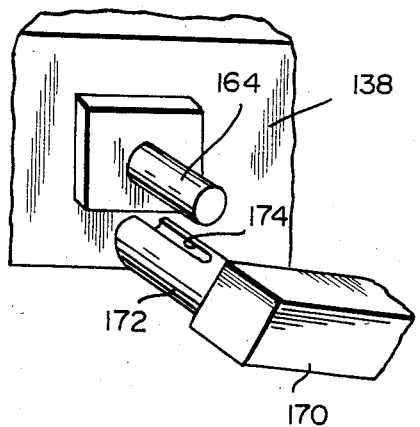
FIG. 11 is an enlarged partial view of the holding mechanism provided on the extending arms of the dolly and its cooperation with the crane extending arms.

The rotation of upper base portion 20 in the horizontal plane is accomplished by the rotation of crank handle 124 which is affixed upon a driveshaft 126 having a worm gear 128 disposed thereon in intimate cooperating contact with worm wheel 130 which in turn is geared to upper base portion or plate 20 in a conventional manner. Thus, rotation of crank 124 will cause the plate 20 to rotate 360 degrees in the horizontal plane taking with it the articulated arms 12 and an ejection seat which may be mounted thereon as shown in FIGS. 7a, 7b and 7c.

Figure 5:
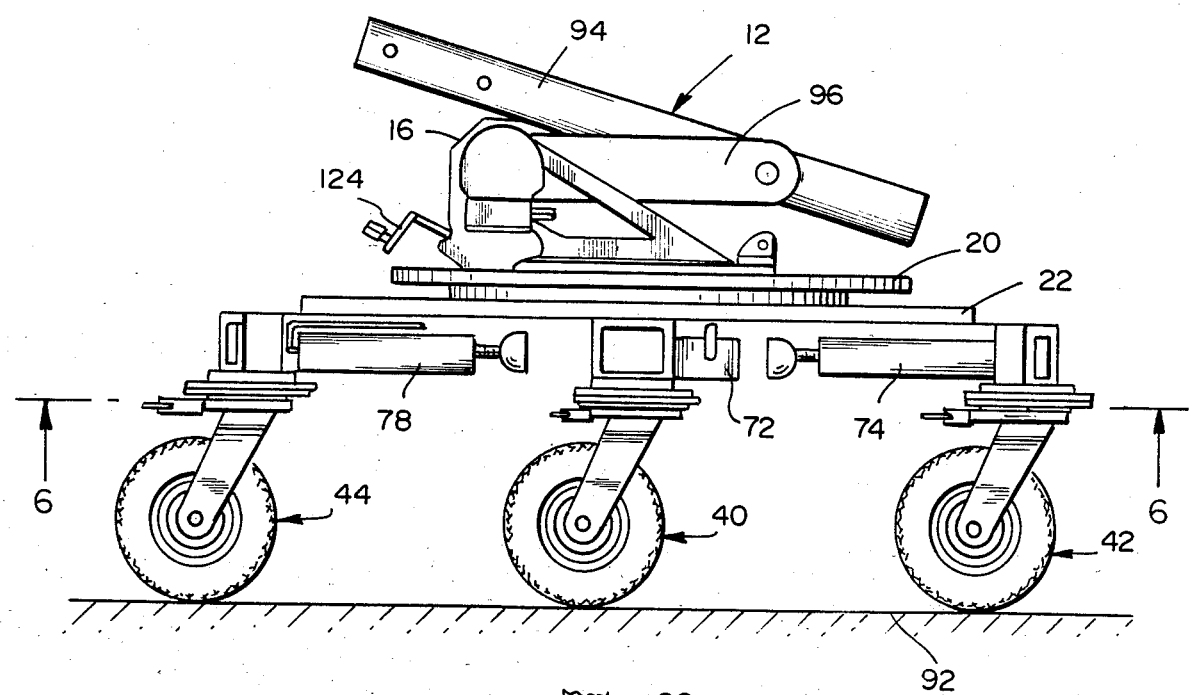
FIG. 5 shows the mobile maintenance in its collapsed or retracted position for storage or movement along a flat surface.
Figure 6:
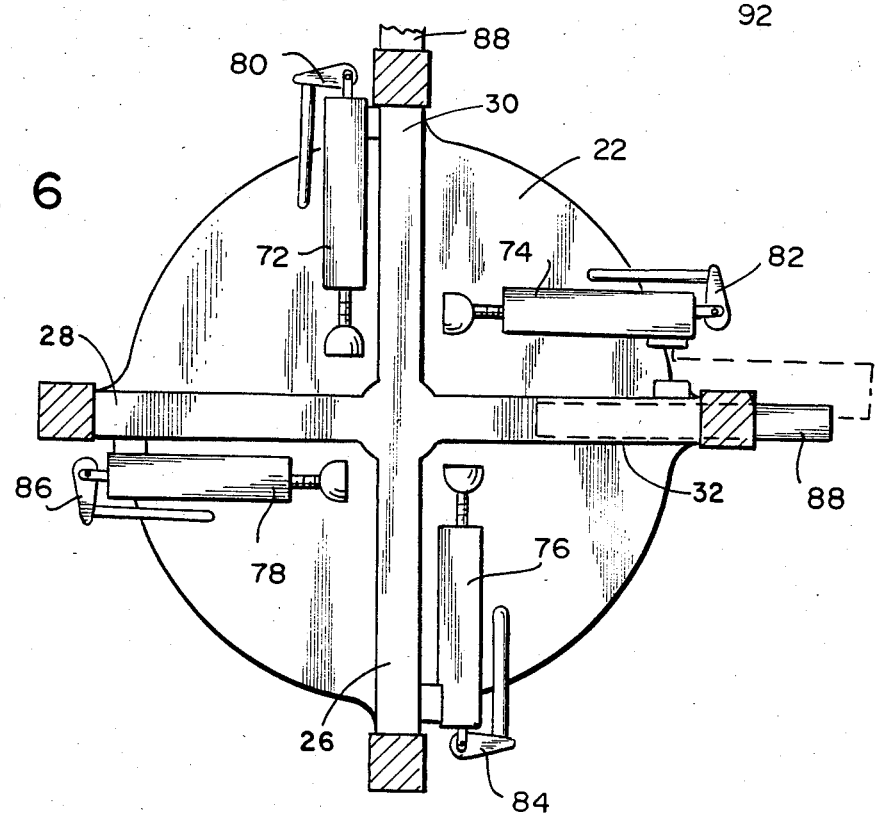
FIG. 6 is a view taken along the line 6—6 of FIG. 5.

FIG. 5 discloses the mobile maintenance stand without the crane apparatus 100 in a collapsed or folded position for transportation and/or storage and FIG. 6 shows the position of the screw jacks 72, 74, 76, and 78 in position for transportation of the mobile stand 10.

Referring now to FIGS. 8 and 9, there is shown a crane assembly 100 mounted on a mobile maintenance stand. FIG. 8 discloses a crane assembly having 4 telescoping sections 132, 134, 136, and 138 in their fully extended position and the crane assembly 100 tilted at an angle from the vertical in order to permit the boom portion 140 of the crane assembly 100 to extend outwardly over the cockpit of an aircraft not shown. The distal, outwardly extending end 142 is provided with a pulley arrangement over which is placed a cable 144 and hook 146 affixed thereto which is adapted to engage and eye bolt 148 generally provided on the ejection seat 14. The cable 144 extends around the end pulley 142 and through the telescoping sections 132, 134, 136, and 138 of crane assembly 100 where it is affixed to a conventional ratcheted raising and lowering mechanism 150 which may be either manually operated or motor driven. The hook 146 is connected to the eye bolt 148 while the ejection seat 14 is positioned in an aircraft, not shown. Once the ejection seat 14 is released from the aircraft by removal of the retaining bolts, the crane operator may lift the seat out of the cockpit away from the aircraft and lower it until the seat is received between the articulated arms 12 provided on the mobile maintenance stand as shown in FIG. 9. The apertures 152 and 154 provided in the upper section 94 of the articulated arms 12 permit the use of retaining devices, (e.g. bolts), not shown, similar to that utilized to affix the ejection seat 14 in the airplane's cockpit. The hook 146 may then be removed from eye bolt 148 and the crane assembly 100 removed from the maintenance stand 10 permitting rotation of the ejection seat 14 so that the maintenance thereon may be performed by a maintenance mechanic. Positioning of the ejection seat 14 may be accomplished as shown in FIG. 7a, 7b and 7c.

Figure 12:
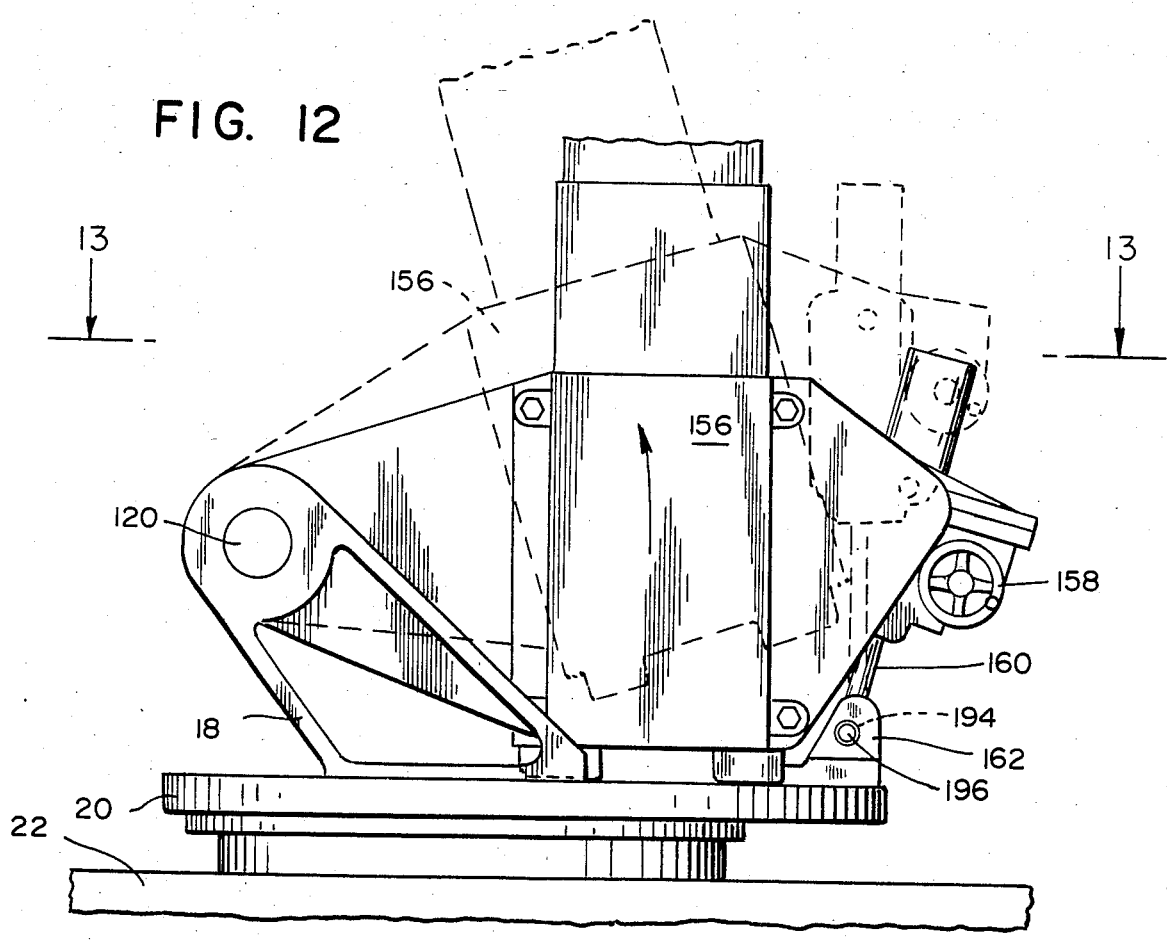
FIG. 12 is a side view in elevation of the crane apparatus shown in FIGS. 8 and 9 illustrating the displacement of the crane from its normal vertical axis.

The lower portion 156 of the crane assembly 100 includes a handle 158 affixed on a shaft and gearing mechanism, not shown, which permits for the tilting of the crane assembly 100 off its normal vertical alignment. By turning crank handle 158 and extending screw member 160 is caused to exert pressure against the retaining bracket 162 thereby tilting the crane assembly 100 away from the vertical position. This is accomplished by rotating the crane assembly 100 about its pivotal axis 120 which is more clearly seen by referring to FIG. 12.

Figure 10:
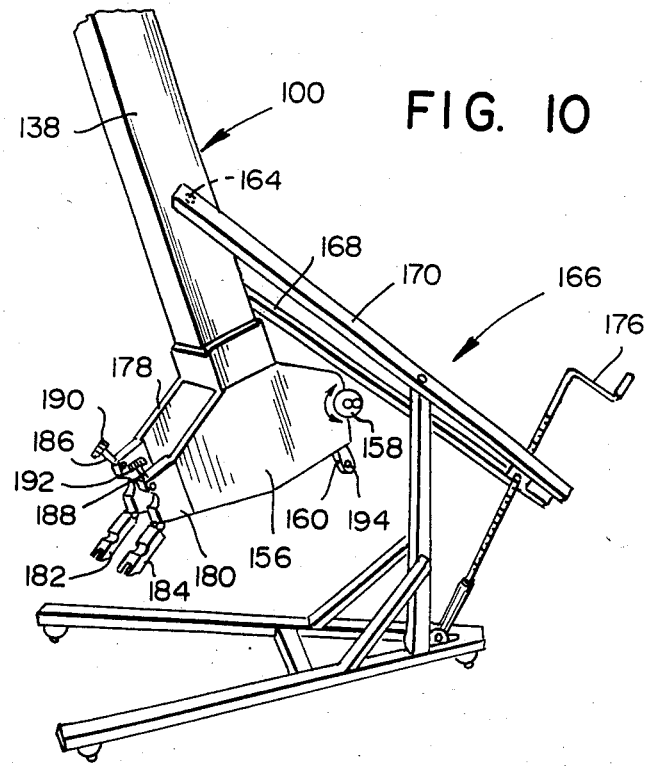
FIG. 10 is a partial pictorial representation of a crane apparatus and its installation dolly prior to installation on a mobile maintenance stand.
Figure 13:
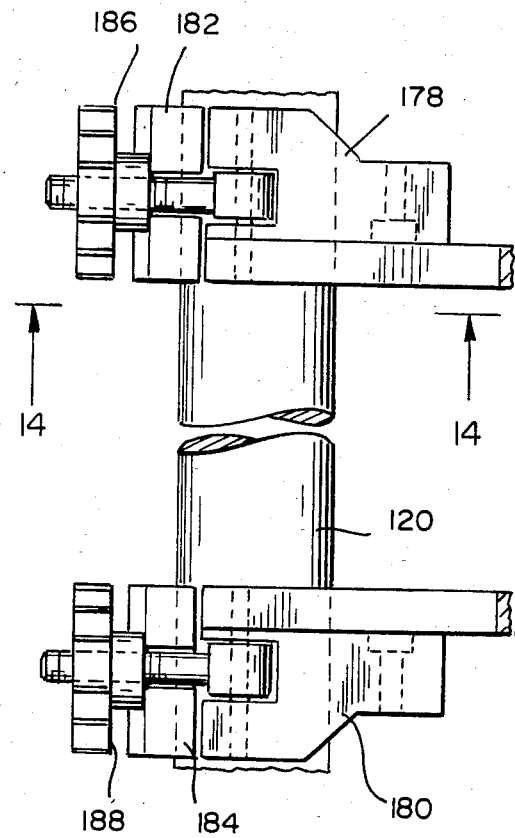
FIG. 13 is a view taken along the line 13—13 shown in FIG. 12.
Figure 14:
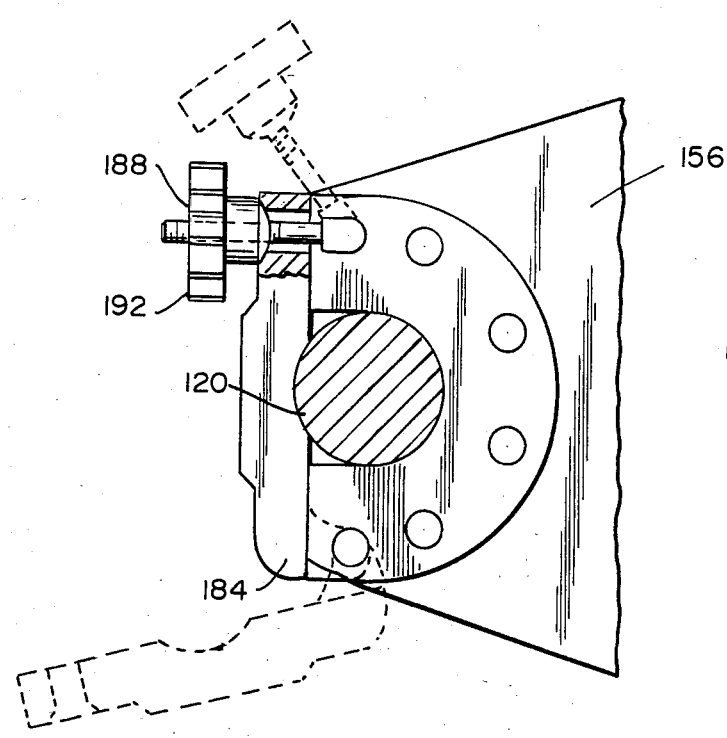
FIG. 14 is an enlarged, partial view taken along the line 14—14 of FIG. 13.

Referring now to FIGS. 10, 11, 12, 13 and 14, there is shown the detailed construction of the crane assembly 100, more specifically the lower portion 156 thereof and its mounting upon the mobile maintenance stand 10. The lowest section 138 of the crane assembly 100 is provided with a pair of pivotal arms 164 which extend outwardly from section 138 and at right angles to both the longitudinal and transverse axis thereof. Its position is chosen to be slightly at or above the center gravity of the crane assembly when the sections 132, 134, and 136 are in their fully collapsed position and within section 138. A dolly 166 having extending arms 168 and 170 is provided with an inwardly extending holding member 172 that contains a generally semi-circularly shaped depression 174 adapted to loosely receive pivotal arms 164 therein. Thus, the crane assembly may be stored in either the horizontal or vertical position when removed from the mobile maintenance stand 10 and the arms 168 and 170 may be positioned to receive the pivotal arms 164. Turning of crank handle 176 of dolly 166 will permit the arms 168 and 170 to raise the crane assembly 100 from its resting position and by virtue of the pivotal arms being at or above the center of gravity of the crane assembly will cause the lower portion 156 to move slowly to a downward position as shown in FIG. 10. The forward arms 178 and 180 of the lower portion 150 of the crane assembly 100 are provided with latching swing arms 182 and 184 and locking mechanisms 186 and 188 of conventional design.

In order to place the crane assembly 100 onto the maintenance stand 10, it is necessary to move the dolly in close proximity with the stand 10 so that the arms 178 and 180 are brought proximate to the axle 120 on the maintenance stand 10. Latching swing arms 182 and 184 are brought beneath axle 120 and raised therearound where they are in position by locking mechanisms 186 and 188 by merely turning the threaded knobs 190 and 192 provided thereon until the swing arms 182 and 184 are firmly retained in position. The extending eye 194 provided in screw member 160 is placed within retaining bracket 162 and a removable pin 196 is placed in the aligning aperture provided in bracket 162 thereby retaining the crane assembly in position on the mobile maintenance stand. If the crane member 100 is to be removed from the stand, this procedure is reversed.

In operation, the crane assembly 100 is affixed to the mobile maintenance stand as described hereinbefore. The crane is fully extended and the mobile maintenance stand and crane apparatus is moved towards the aircraft from which the ejection seat 14 is to be removed. After connection of the hook 146 to the eye bolt 148 provided on the ejection seat, the ejection seat is released from the aircraft and the crane is then utilized to remove the seat therefrom. Once the seat is free and clear of the aircraft, it is lowered into position where it may be retained by the articulated arms provided on the maintenance stand. The hook 146 is then removed from the ejection seat 14 and the crane retracted to its collapsed position. The dolly 166 is then brought close to the maintenance stand so that the arms 168 and 170 thereof can permit holding mechanism 172 to come into contact with pivotal arms 164. Pin 196 is then removed from eye 194 of the screw member 160 and the latching swing arms 182 and 184 is released so that the dolly may now raise the crane assembly 100 away from the mobile maintenance stand 10 and separate the two members. Maintenance technicians are then free to position the ejection seat 14 in any manner suitable for performing their tasks.

Hereinbefore has been disclosed a mobile maintenance stand and crane apparatus which is lightweight, transportable, and utilizable in the field with a minimum of manpower. It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed is:

1. A mobile maintenance stand for servicing and transporting ejection seats, comprising
  (a) a lower generally flat base portion having;
    (i) a plurality of equally spaced radially extendable arms,
    (ii) rotatable means disposed proximate the distal ends of each of said arms for providing movement of said stand along a surface,
    (iii) said extendable arms having at least a first and a second section, said seaconcd section being removably affixed to said first section of each said arms providing sway bracing means for additional stability, and
    (iv) removable rigidity means for providing rigidity to said lower base portion, one of said removable rigidity means being disposed proximate the distal ends of said first or said second arm sections of each of said arms; and
  (b) an upper generally flat base portion rotatably affixed to said lower base portion having;
    (i) a pair of articulated arms disposed in an upwardly direction adapted to removably retain one of said ejection seats therebetween, and
    (ii) means for adjusting said articulated arms to anyone of a plurality of positions for performing maintenance on said ejection seat.

2. A mobile maintenance stand according to claim 1 wherein said radially extendable arms are rectangularly-shaped when viewed in cross-section and include a plurality of telescoping additional sections having at least a first and a last section, the underside of the distal ends of said first extendable arm section of said radially extendable arms being provided with said rotatable means, the distal ends of said extendable arm last sections of said radially extendable arms being adapted to receive said removable rigidity means.

3. A mobile maintenance stand according to claim 1 wherein said removable rigidity means includes an adjustable screw jack.

4. A mobile maintenance stand according to claim 1 wherein each of said arms are provided with means for storing said rigidity means during movement of said maintenance stand across a surface.

5. A mobile maintenance stand according to claim 1 wherein said upper base portion may be rotated 360 degrees in a horizontal plane and said articulated arms permit rotation of said ejection seat for at least 270 degrees in a vertical plane.

6. A mobile maintenance stand according to claim 1 wherein said radially extendable arms are rectangularly-shaped when viewed in cross-section and include a plurality of sections, the underside of the distal ends of said first extendable section of said radially extendable arms being provided with said rotatable means, the distal ends of said extendable last sections of said radially extendable arms being adapted to receive said removable rigidity means.

7. A mobile maintenance stand according to claim 1 wherein said lower base portion is provided with means for storing each of said rigidity means during movement of said maintenance stand across a surface.

8. A mobile maintenance stand according to claim 1 wherein said lower base portion is provided with means for removably retaining each of said rigidity means during its use.

9. A mobile maintenance stand and crane apparatus for removing, servicing and transporting ejection seats comprising, in combination:
(A) a base member, said base member including:
  (i) a lower portion having a plurality of radially extendable arms, each of said arms being provided with;
    (a) means for providing movement of said base along a surface disposed at the distal ends of said extendable arms,
    (b) means for removably affixing sway braces thereto, and
    (c) removable means for providing rigidity, said rigidity means being received by and cooperating with said sway braces and said lower base portion arms,
  (ii) an upper portion having a horizontally disposed member rotatably affixed to said lower portion, said upper portion including;
    (a) a pair of vertically disposed brackets having a horizontally disposed axle rotatably disposed therein, said axle having a pair of arms disposed on the distal ends thereof, and
    (b) bracket means each rotatably affixed to said pair of arms disposed on said axle adapted to receive said ejection seat therebetween; and
(B) a telescoping crane member including;
  (i) a foot portion having means for receiving said axle and retaining means for removably retaining said crane member upon said upper base portion, and
  (ii) a head portion having an extending boom and additional means for removably connecting, raising and lowering said ejection seats, said additional means being controlled from a control means disposed on said upper base portion.

10. A mobile maintenance stand and crane apparatus according to claim 9 wherein said radially extendable arms are rectangularly-shaped when viewed in cross-section and include a plurality of sections having at least a first and a last section, the underside of the distal ends of each of said first sections of said radially extending arms being provided with said means for providing movement along a surface, the distal ends of each of said last sections of said radially extending arms being adapted to receive said removable rigidity means.

11. A mobile maintenance stand and crane apparatus according to claim 10 wherein said removable rigidity means includes an adjustable screw jack and said means for providing movement along a surface is a wheel.

12. A mobile maintenance stand and crane apparatus according to claim 11 wherein each of said arms are provided with means for storing said screw jacks during movement of said stand across a surface.

13. A mobile maintenance stand and crane apparatus according to claim 9 further including dolly means for removing and installing said crane member from said mobile maintenance stand.

14. A mobile maintenance stand and crane apparatus according to claim 9 wherein said lower base portion is provided with means for storing each of said rigidity means during movement of said maintenance stand across a surface.

15. A mobile maintenance stand and crane apparatus according to claim 9 wherein said lower base portion is provided with means for removably retaining each of said rigidity means during its use.

16. A mobile maintenance stand and crane apparatus according to claim 9 wherein said removable rigidity means includes an adjustable screw jack.

17. A mobile maintenance stand and crane apparatus according to claim 9 wherein each of said arms are provided with means for storing said rigidity means during movement of said maintenance stand across a surface.

18. A mobile maintenance stand and crane apparatus according to claim 9 wherein said upper base portion may be rotated 360 degrees in a horizontal plane and said articulated arms permit rotation of said ejection seat for at least 270 degrees in a vertical plane.

19. A mobile maintenance stand for servicing and transporting ejection seats, comprising
(a) a lower generally flat base portion having;
  (i) a plurality of equally spaced radially extendable arms, having at least a first and last section each of said arms being provided with rotatable means disposed proximate the distal ends thereof for providing movement along a surface for said stand,
  (ii) sway bracing means removably affixed to the first section of each said arms for providing additional stability, and
  (iii) removable means for providing rigidity to said lower base portion, said removable rigidity means being disposed proximate the distal end of each of said arms;
(b) an upper generally flat base portion rotatably affixed to said lower base portion having;
  (i) a pair of articulated arms disposed in an upwardly direction adapted to removably retain one of said ejection seats therebetween, and
  (ii) means for adjusting said articulated arms to any one of a plurality of positions for performing maintenance on said ejection seat; and
(c) telescoping crane means having;
  (i) a foot portion, said foot portion having means disposed thereon for removable affixment to said upper base portion, and
  (ii) a head portion having an extending boom and additional means for removably connecting, raising and lowering said ejection seats, said additional means being controlled from a control means disposed upon said upper base portion.

* * * * *